US006935953B2

(12) United States Patent
Marcu

(10) Patent No.: US 6,935,953 B2
(45) Date of Patent: Aug. 30, 2005

(54) METHOD AND APPARATUS FOR ENCODING VOUCHERS IN A CASINO GAMING SYSTEM

(76) Inventor: Adrian R. Marcu, 487 Corvallis Ct., Reno, NV (US) 89511

( * ) Notice: Subject to any disclaimer, the term of this patent is extended or adjusted under 35 U.S.C. 154(b) by 0 days.

(21) Appl. No.: 10/352,435

(22) Filed: Jan. 28, 2003

(65) Prior Publication Data

US 2003/0166412 A1 Sep. 4, 2003

Related U.S. Application Data

(63) Continuation of application No. 09/652,163, filed on Aug. 31, 2000, now abandoned.

(51) Int. Cl.$^{7}$ ................................................ A63F 13/00
(52) U.S. Cl. ........................................... 463/29; 463/20
(58) Field of Search ......................... 463/20, 21, 25–29

(56) References Cited

U.S. PATENT DOCUMENTS

| | | | | |
|---|---|---|---|---|
| 3,825,905 | A | 7/1974 | Allen, Jr. | 340/172.5 |
| 3,838,264 | A | 9/1974 | Maker | 235/153 |
| 4,200,770 | A | 4/1980 | Hellman et al. | 178/22 |
| 4,218,582 | A | 8/1980 | Hellman et al. | 178/22 |
| 4,354,251 | A | 10/1982 | Hellwig et al. | 364/900 |
| 4,405,829 | A | 9/1983 | Rivest et al. | 178/22.1 |
| 4,467,424 | A | 8/1984 | Hedges et al. | 364/412 |
| 4,727,544 | A | 2/1988 | Brunner et al. | 371/21 |
| 4,752,068 | A | 6/1988 | Endo | 273/1 |
| 4,759,064 | A | 7/1988 | Chaum | 380/30 |
| 4,837,728 | A | 6/1989 | Barrie et al. | 364/412 |
| 4,845,715 | A | 7/1989 | Francisco | 371/53 |
| 4,848,744 | A | 7/1989 | Steininger et al. | 273/1 |
| 4,856,787 | A | 8/1989 | Itkis | 273/237 |
| 4,865,321 | A | 9/1989 | Nakagawa et al. | 273/85 |
| 4,930,073 | A | 5/1990 | Cina, Jr. | 364/300 |
| 4,951,149 | A | 8/1990 | Faroudja | 358/230 |
| 5,004,232 | A | 4/1991 | Wong et al. | 273/435 |
| 5,021,772 | A | 6/1991 | King et al. | 340/724 |
| 5,235,642 | A | 8/1993 | Wobber et al. | 380/25 |
| 5,259,613 | A | 11/1993 | Marnell, II | 273/138 |
| 5,265,874 | A | * 11/1993 | Dickinson et al. | 463/20 |
| 5,283,734 | A | 2/1994 | Von Kohorn | 364/412 |
| 5,288,978 | A | 2/1994 | Iijima | 235/380 |
| 5,290,033 | A | 3/1994 | Bittner et al. | 273/138 |
| 5,291,585 | A | 3/1994 | Sato et al. | 395/500 |
| 5,326,104 | A | 7/1994 | Pease et al. | 273/138 |
| 5,342,047 | A | 8/1994 | Heidel et al. | 273/85 |
| 5,343,527 | A | 8/1994 | Moore | 380/4 |
| 5,465,364 | A | 11/1995 | Lathrop et al. | 395/700 |
| 5,488,702 | A | 1/1996 | Byers et al. | 395/186 |
| 5,489,095 | A | 2/1996 | Goudard et al. | 273/138 |
| 5,586,766 | A | 12/1996 | Forte et al. | 273/309 |

(Continued)

FOREIGN PATENT DOCUMENTS

WO WO 01/22267 A1 9/1999 ........... G06F/17/00

OTHER PUBLICATIONS

IBM TD, Scalable Method for Detection of False Receipts Used to Return Goods, Feb. 1996.*

Anna Stockel, Securing Data and Finacial Transactions, 0–7803–2627–X/95, 1995 IEEE.*

(Continued)

*Primary Examiner*—John M. Hotaling, II
(74) *Attorney, Agent, or Firm*—Marshall, Gerstein & Borun LLP

(57) ABSTRACT

The apparatus and method described herein transmits a unique machine identification number and a sequence number from a local host to a casino game via a network. In the event that the local host is unable to provide the sequence number, the casino game generates the sequence number locally. Subsequently, the casino game performs a series of numerical operations starting with the machine identification number and the sequence number to generate an encoded a voucher number. The voucher is then printed for the patron and the number is reported to the local host.

23 Claims, 8 Drawing Sheets

U.S. PATENT DOCUMENTS

| | | | | | |
|---|---|---|---|---|---|
| 5,604,801 | A | | 2/1997 | Dolan et al. | 380/21 |
| 5,643,086 | A | | 7/1997 | Alcorn et al. | 463/29 |
| 5,644,704 | A | | 7/1997 | Pease et al. | 395/183.18 |
| 5,655,965 | A | | 8/1997 | Takemoto et al. | 463/20 |
| 5,704,835 | A | | 1/1998 | Dietz, II | 463/20 |
| 5,725,428 | A | | 3/1998 | Achmüller | 463/20 |
| 5,737,418 | A | | 4/1998 | Saffari et al. | 380/9 |
| 5,800,264 | A | | 9/1998 | Pascal et al. | 463/16 |
| 5,934,672 | A | | 8/1999 | Sines et al. | 273/143 |
| 6,048,269 | A | | 4/2000 | Burns et al. | 463/25 |
| 6,071,190 | A | | 6/2000 | Weiss et al. | 463/25 |
| 6,104,815 | A | | 8/2000 | Alcorn et al. | 380/251 |
| 6,106,396 | A | | 8/2000 | Alcorn et al. | 463/29 |
| 6,116,402 | A | * | 9/2000 | Beach et al. | 194/216 |
| 6,280,326 | B1 | * | 8/2001 | Saunders et al. | 463/25 |
| 6,280,328 | B1 | * | 8/2001 | Holch et al. | 463/42 |
| 6,340,331 | B1 | * | 1/2002 | Saunders et al. | 463/25 |
| 6,500,067 | B1 | * | 12/2002 | Luciano et al. | 463/25 |
| 6,652,380 | B1 | * | 11/2003 | Luciano | 463/25 |
| 6,679,775 | B1 | * | 1/2004 | Luciano et al. | 463/25 |
| 6,682,421 | B1 | * | 1/2004 | Rowe et al. | 463/25 |
| 2002/0049909 | A1 | | 4/2002 | Jackson et al. | 713/188 |

OTHER PUBLICATIONS

A. Denis and W. Kinser, Secure and Resilient Data Printed on Paper, 0–7803–5579–Feb. 1999, 1999 IEEE.*

C. Boyd, Modern Data Encryption, Electronic and Communication Engineering Journal, Oct. 1993.*

Jeffery A Griffin, Privacy and Security in the Digital Age, 0–7803–4327–Jan. 1998, Jan. 1998 IEEE.*

Ruffin Scott, "Understanding Cyclic Redundancy Check," ACI US, Technical Note Mar. 11, 1999, available at http://www.4d.com/docs/CMU/CMU79909.htm.

Casino Journal of Nevada, vol. IX No. 10, Oct. 1996, pp. 64–66, 68–76, 78, 82, 84, 86, 88, 90, 92, 94, 96, 98, 145, and 146.

"The Journey Is About To Begin", Odyssey Brochure.

"More fun to play. More fun to win" Odyssey Brochure.

"World of Slots: The Future is Now", Casino Journal, vol. 10, No. 10, Oct. 1997.

"World of Slots '98: A Special Report", Casino Journal, vol. 11, No. 9, Sep. 1998.

"One Armed Bandits: The Next Generation of Slot Machines", Chance, Spring 1998.

"Want High–Entertainment Games? Get What's Next", Bally Gaming Advertisement, 1998.

"Player–Directed Interactive Games Attract Players and Operators Brings Cash and Action", Casino Journal, Dec. 1997.

"Scalable Method for Detection of False Receipts Used to Return Goods", IBM TD, Feb. 1996.

Anna Stockel, "Securing Data and Financial Transactions", *IEEE*, 0–7803–2627–X/95 (1995).

A. Denis and W. Kinser, "Secure and Resilent Data Printed on Paper", *IEEE*, 0–7803–5579–Feb. 1999 (1999).

C. Boyd, "Modern Data Encryption", Electronic and Communication Engineering Journal, Oct. 1993.

J. Griffin, "Privacy and Security in the Digital Age", *IEEE*, 0–7803–4327–Jan. 1998, Jan. 1998.

* cited by examiner

METHOD AND APPARATUS FOR ENCODING VOUCHERS IN A CASINO GAMING SYSTEM

CROSS-REFERENCE TO RELATED APPLICATIONS

This application is a continuation of, and claims priority to, U.S. patent application Ser. No. 09/652,163, filed Aug. 31, 2000 now abandoned, entitled "METHOD AND APPARATUS FOR ENCODING VOUCHERS IN A CASINO GAMING SYSTEM," which is herein incorporated by reference in its entirety for all purposes.

TECHNICAL FIELD OF THE INVENTION

The present invention relates in general to a system for encoding financial information and in particular to a method and apparatus for encoding machine readable vouchers for use in a cashless casino gaming system.

BACKGROUND

Casino games, such as slot machines, must have the capacity to hold a large amount of cash. Although on average, a casino game takes in more cash than it dispenses, this average may accrue over a short period of time or over a long period of time. In order to continuously operate over that period of time without undue operator intervention (e.g., a casino employee retrieving excess money too often or paying off medium sized jackpots too often), the casino game must use a large portion of its interior space to store money.

Increased storage space for money and the ability to automatically handle that money increases the cost and the size of the casino game. In addition, as a casino handles more physical money, the overhead costs associated with handling that money increase. The money must be counted, stored, transported, guarded, etc.

As an alternative to physical money, some casinos employ a cashless system. For example, if a patron wins a medium sized jackpot, electronic credits are awarded. If the patron proceeds to lose those credits, the money is not needed. If the patron cashes out the credits, a receipt is printed which contains an account number. The patron may then take the receipt to a house teller to receive his cash.

However, this receipt system has certain drawbacks. First, the casino game must be in communication with a central computer in order to update the account information. In addition, criminals may attempt to produce counterfeit receipts if future account numbers can be determined by past account numbers. Still further, the patron is unable to use his receipt like cash in another casino game. He must first convert the receipt to cash and then proceed to another game.

SUMMARY OF THE INVENTION

In one aspect, the invention is directed to a method in a casino gaming system, the casino gaming system comprising a plurality of casino gaming machines operatively coupled to a host computer via a network, wherein each of the plurality of casino gaming machines has associated therewith a respective unique machine identification number. The method comprises determining a sequence number associated with a voucher number to be generated, wherein the sequence number is different from sequence numbers associated with at least some voucher numbers previously generated. The method also comprises combining, using a casino gaming machine, the machine identification number associated with the casino gaming machine with the sequence number to form a combined number. The method additionally comprises performing a cyclic redundancy check (CRC) operation on at least a portion of the combined number, using the casino gaming machine, to generate at least one CRC result, and generating a voucher number based on the at least one CRC result. The method further comprises writing the voucher number generated based on the at least one CRC result to a machine readable medium.

In another aspect, the invention is directed to a casino gaming machine for use in a casino gaming system, the casino gaming system comprising a plurality of casino gaming machines operatively coupled to a host computer via a network, wherein each of the plurality of casino gaming machines has associated therewith a respective unique machine identification number. The casino gaming machine comprises a network interface circuit to operatively link the casino gaming machine to the host computer via the network, and a voucher dispenser. The casino gaming machine additionally comprises a controller operatively coupled to the display unit, the network interface circuit, and the voucher dispenser, the controller comprising a microprocessor and a memory operatively coupled to the microprocessor. The controller is programmed to determine a sequence number associated with a voucher number to be generated, wherein the sequence number is different from sequence numbers associated with at least some voucher numbers previously generated. The controller is also programmed to combine the machine identification number associated with the casino gaming machine with the sequence number to form a combined number. The controller is additionally programmed to perform a cyclic redundancy check (CRC) operation on at least a portion of the combined number to generate at least one CRC result, and to generate a voucher number based on the at least one CRC result. The controller is further programmed to cause the voucher dispenser to write the voucher number generated based on the at least one CRC result to a machine readable medium.

In yet another aspect, the invention is directed to a computer readable medium storing a software program for use in a casino gaming system, the casino gaming system comprising a plurality of casino gaming machines operatively coupled to a host computer via a network, wherein each of the plurality of casino gaming machines has associated therewith a respective unique machine identification number, the software program for generating a voucher number at one of the plurality of casino gaming machines. The computer readable medium comprises first code for determining a sequence number associated with a voucher number to be generated, wherein the sequence number is different from sequence numbers associated with at least some voucher numbers previously generated. The computer readable medium also comprises second code for combining the machine identification number associated with the casino gaming machine that is to generate the voucher number with the sequence number to form a combined number. The computer readable medium additionally comprises third code for performing a cyclic redundancy check (CRC) operation on at least a portion of the combined number to generate at least one CRC result, and fourth code for generating a voucher number based on the at least one CRC result. The computer readable medium further comprises fifth code for writing the voucher number generated based on the at least one CRC result to a machine readable medium.

In still another aspect, the invention is directed to a method in a casino gaming system, the casino gaming system comprising a plurality of casino gaming machines and at least one voucher dispensing machine operatively coupled to a host computer via a network, wherein each of the plurality of casino gaming machines and the at least one voucher dispensing machine has associated therewith a respective unique machine identification number. The method comprises determining a sequence number associated with a voucher number to be generated, wherein the sequence number is different from sequence numbers associated with at least some voucher numbers previously generated, and combining, using a voucher dispensing machine, the machine identification number associated with the casino gaming machine with the sequence number to form a combined number. The method also comprises performing a cyclic redundancy check (CRC) operation on at least a portion of the combined number, using the voucher dispensing machine, to generate at least one CRC result. The method additionally comprises generating a voucher number based on the at least one CRC result using the voucher dispensing machine, and writing the voucher number generated based on the at least one CRC result to a machine readable medium.

In yet another aspect, a voucher dispensing machine for use in a casino gaming system, the casino gaming system comprising a plurality of casino gaming machines and at least one voucher dispensing machine operatively coupled to a host computer via a network, wherein each of the plurality of casino gaming machines and the at least one voucher dispensing machine has associated therewith a respective unique machine identification number, is provided. The voucher dispensing machine comprises a network interface circuit to operatively link the voucher dispensing machine to the host computer via the network, and a voucher dispenser. The voucher dispensing machine additionally comprises a controller operatively coupled to the display unit, the network interface circuit, and the voucher dispenser, the controller comprising a microprocessor and a memory operatively coupled to the microprocessor. The controller is programmed to determine a sequence number associated with a voucher number to be generated, wherein the sequence number is different from sequence numbers associated with at least some voucher numbers previously generated. The controller is also programmed to combine the machine identification number associated with the voucher dispensing machine with the sequence number to form a combined number. The controller is further programmed to perform a cyclic redundancy check (CRC) operation on at least a portion of the combined number to generate at least one CRC result, and to generate a voucher number based on the at least one CRC result. The controller is still further programmed to cause the voucher dispenser to write the voucher number generated based on the at least one CRC result to a machine readable medium.

BRIEF DESCRIPTION OF THE DRAWINGS

These and other features and advantages of the present invention will be apparent to those of ordinary skill in the art in view of the detailed description of the preferred embodiments which is made with reference to the drawings, a brief description of which is provided below.

DETAILED DESCRIPTION OF THE PREFERRED EMBODIMENTS

In general, the system and method described herein transmits a unique machine identification number and a sequence number from a local host to a casino game via a network. In the event that the local host is unable to provide the sequence number, the casino game generates the sequence number locally. Subsequently, the casino game performs a series of numerical operations starting with the machine identification number and the sequence number to generate an encoded a voucher number. The voucher is then printed for the patron and the number is reported to the local host.

Figure 1:
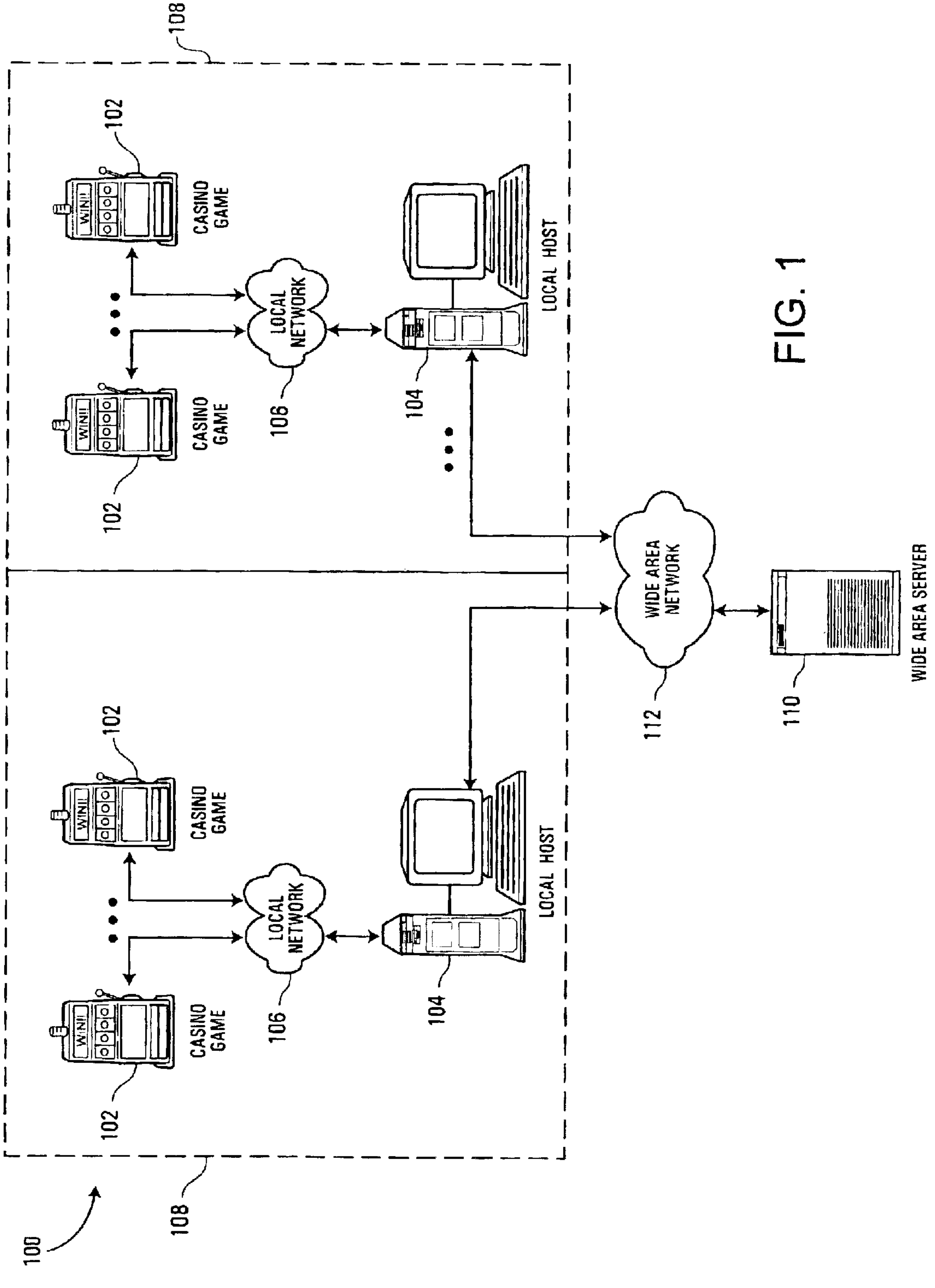
FIG. 1 is high level block diagram of a casino game network.

A block diagram of a casino game network 100 is illustrated in FIG. 1. A plurality of casino games 102 and a local host 104 are interconnected by a local network 106. Although slot machines are shown, the casino games 102 may be any type of electronic game. Further, a variety of casino games 102 may be located on the same local network 106. In some instances, a casino game 102 may be replaced by a voucher dispensing machine similar to an automatic teller machine. The voucher dispensing machine accepts credit cards, debit cards, cash, etc. and dispenses a cashless casino voucher. Preferably, the local host 104 is an off the shelf computing device programmed to perform the steps described below. However, a person of ordinary skill in the art will readily appreciate that a custom device may be constructed to serve as the local host 104.

A plurality of these local game clusters 108 may be connected to a wide area server 110 by a wide area network 112. In this manner, less powerful local host computers may be used without sacrificing nearly unlimited expandability. In addition, game clusters may be located in geographically disparate locations via the wide area network 112. For example, two or more independently operated casinos located in separate physical locations may share a common cashless voucher system, thereby allowing patrons of one casino to use their vouchers in another casino and vice-versa.

Figure 2:
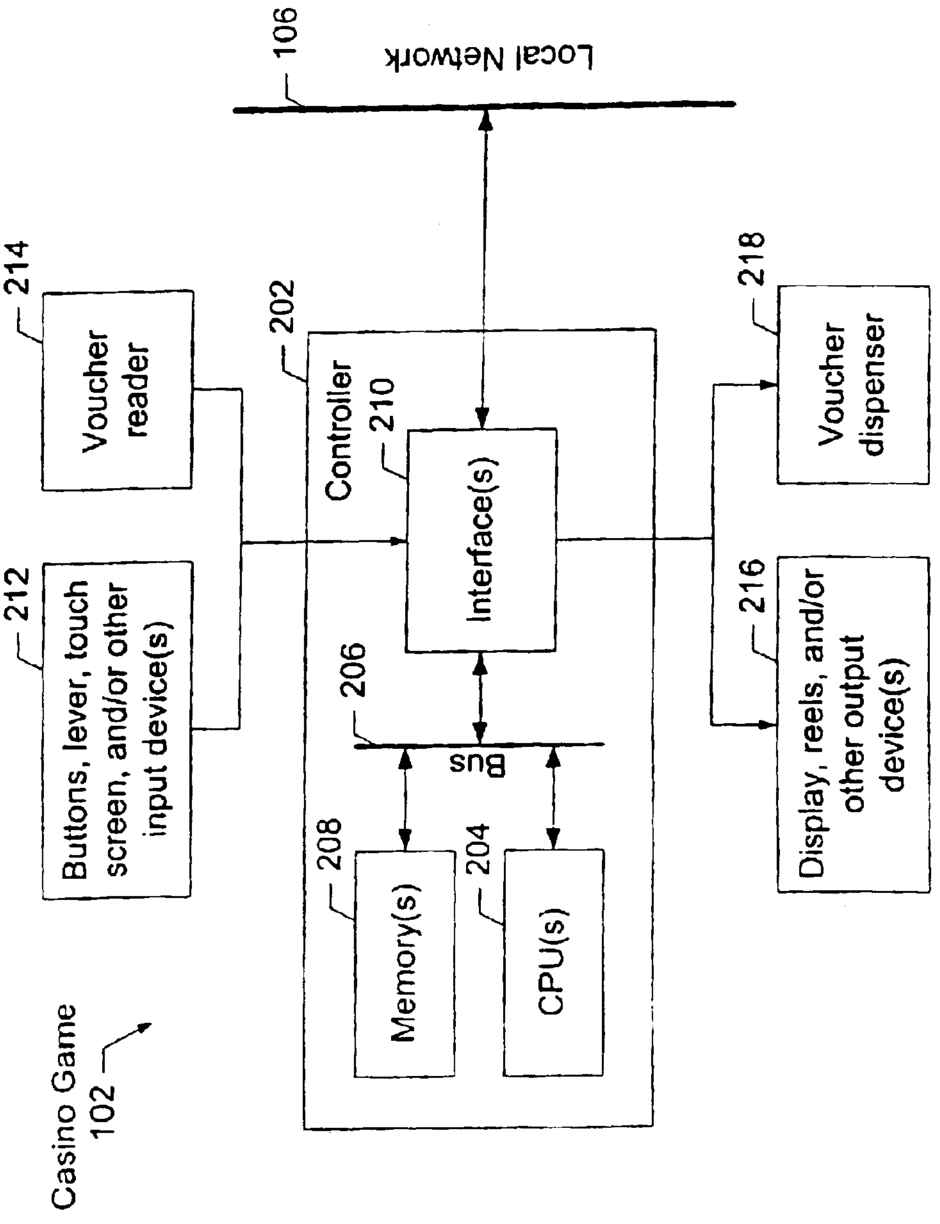
FIG. 2 is a more detailed block diagram of one of the casino games illustrated in FIG. 1.

A more detailed diagram of casino game 102, is illustrated in FIG. 2. A controller 202 in the casino game 102 preferably includes a central processing unit 204 electrically coupled by an address/data bus 206 to a memory device 208 and an interface circuit 210. The CPU 204 may be any type of well known CPU, such as an Intel i960, an Intel Pentium™ processor, etc. The memory device 208 preferably includes volatile memory, such as a random-access memory (RAM), and non-volatile memory, such as a read only memory (ROM) and/or a magnetic disk. The memory device 208 stores a software program that implements all or part of the method described below. This program is executed by the CPU 204, as is well known. Some of the steps described in the method below may be performed manually or without the use of the casino game 102.

The interface circuit 210 may be implemented using any data transceiver, such as a proprietary fiber optic data transceiver, a Universal Serial Bus (USB) transceiver, etc. One or more input devices 212 are connected to the interface circuit 210 for entering data and commands into the controller 202. For example, the input device 212 may be a pull lever, keyboard, touch screen, mouse, track pad, track ball, isopoint, and/or a voice recognition system.

In addition, a voucher reader 214 is preferably connected to the interface circuit 210 for reading cashless vouchers issued to a patron. The voucher reader 214 may be any type of device that transforms machine readable symbols into digital data. For example, the voucher reader 214 may be a bar code reader, a magnetic card stripe reader, a magnetic disk drive, an optical disk drive, a solid state memory interface, a radio receiver, an infrared receiver, etc. Preferably, the voucher reader 214 reads an encoded number which is then transmitted to the local host 104 by the controller 202 via the local network 106. In response, the local host 104 verifies the number and determines the monetary value associated with the voucher. This value may then be transmitted back to the controller 202 which issues game credits to the patron. Alternatively, the voucher reader 214 reads the encoded number and the controller 202 verifies the number and determines the monetary value associated with the voucher locally. This alternative approach is especially useful when communication to the local host 104 is temporarily disabled.

One or more output devices 216 are also connected to the controller 202 via the interface circuit 210. Examples of output devices 216 include slot machine reels, cathode ray tubes (CRTs), liquid crystal displays (LCDs), lights, and/or speakers. The output devices 216 generate visual displays of data generated during operation of the casino game 102. The visual displays may include prompts for human operator input, run time statistics, calculated values, and/or detected data.

In addition, a voucher dispenser 218 is preferably connected to the interface circuit 210 for dispensing cashless vouchers to a patron. The voucher dispenser 218 may be any type of device that transforms digital data into machine readable symbols. For example, the voucher dispenser 218 may be a bar code printer, a magnetic card stripe writer, a magnetic disk drive, an optical disk drive, a solid state memory interface, a radio transmitter, an infrared transmitter, etc. Preferably, the voucher dispenser 218 encodes a number onto a voucher which may be easily carried by a patron to another casino game 102. This voucher number is indicative of a monetary value owed by the casino to the patron.

Preferably, the voucher number is determined by the controller 202 based on a unique machine identification number associated with the casino game 102 and a sequence number provided by the local host 104 over the local network 106. The machine identification number may be embedded into the casino game 102 when manufactured, programmed into the casino game memory 208 during a game setup operation, and/or transmitted to the casino game 102 from the local host 104. Preferably, the sequence number is updated by the local host 104 after each voucher is issued. Alternatively, the sequence number may be determined locally by the controller 202 based on the most recently used sequence number. This alternative approach is especially useful when communication to the local host 104 is temporarily disabled.

The casino game 102 exchanges data with other computing devices, including the local host 104, via a connection to the local network 106. The connection may be any type of network connection, such as an Ethernet connection. The local network 106 may be any type of network, such as an intranet or the Internet.

Figure 3:
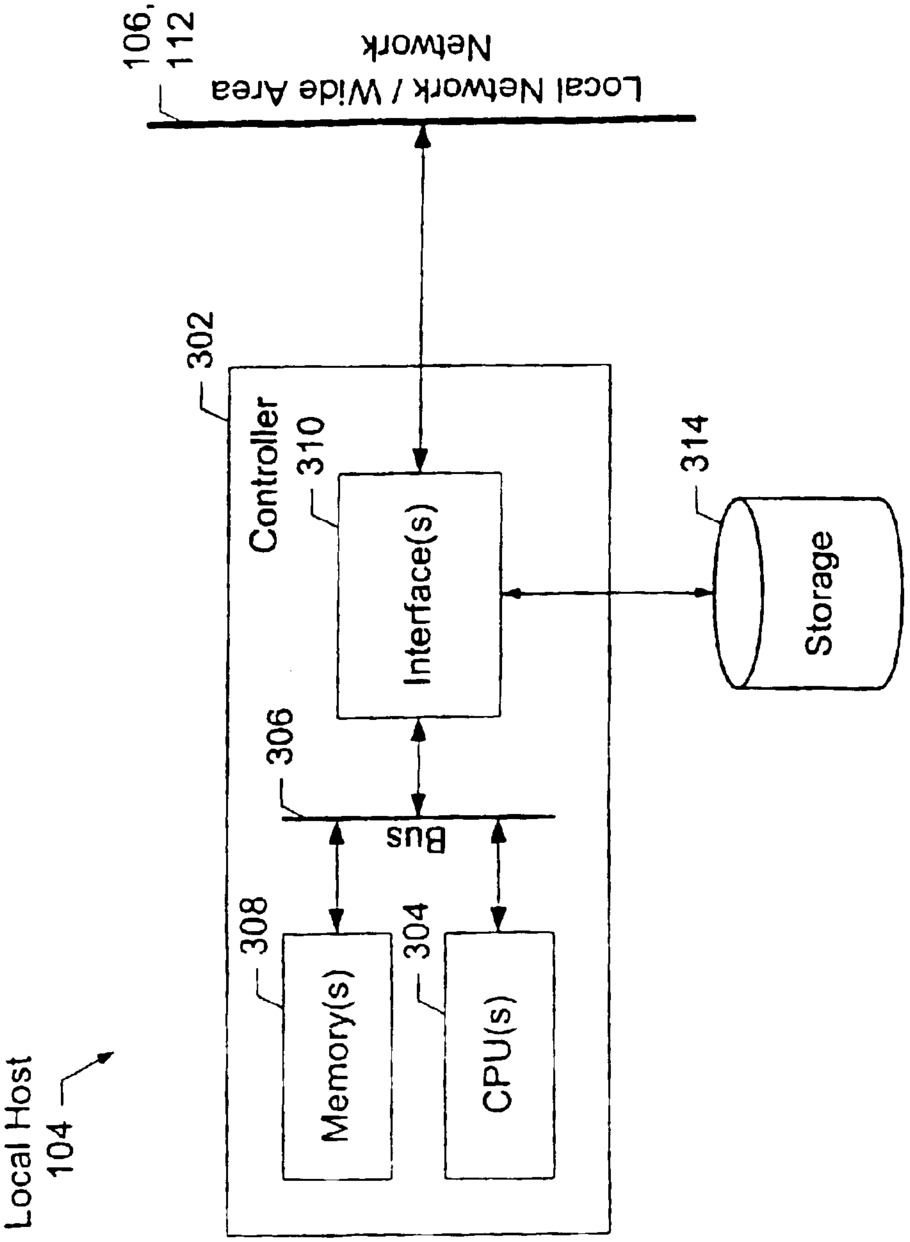
FIG. 3 is a more detailed block diagram of one of the local hosts illustrated in FIG. 1.

A more detailed diagram of a local host 104, is illustrated in FIG. 3. At a high level, a local host 104 is similar to a casino game 102. However, a local host 104 need not include the specialized input/output devices of the casino game 102. Similar to the casino game 102, the local host 104 preferably includes a controller 302 with a central processing unit 304 electrically coupled by an address/data bus 306 to a memory device 308 and an interface circuit 310. The CPU 304 may be any type of well known CPU, such as an Intel i960 Intel Pentium™ processor. The memory device 308 preferably includes volatile memory, such as a random-access memory (RAM), and non-volatile memory, such as a read only memory (ROM) and/or a magnetic disk. The memory device 308 stores a software program that implements all or part of the method described below. This program is executed by the CPU 304, as is well known. Some of the steps described in the method below may be performed manually or without the use of the local host 104.

The interface circuit 210 may be implemented using any data transceiver. Optionally, the local host 104 may include standard input and output devices such as keyboards and displays. In addition to the memory 308 (or included in the memory 308), the local host 104 preferably includes a storage device 314 for storing digital data associated with the cashless voucher operation described in detail below.

The local host 104 may also exchange data with other computing devices via a connection to the local network 106 and the wide area network 112. The connection(s) may be any type of network connection, such as an Ethernet connection. The local network 106 and the wide area network 112 may be separate networks. For example, the local network 106 may be based on a first communication protocol, and the signals associated with the local network 106 may travel over a first set of wires; while the wide area network 112 is based on a second communication protocol, and the signals associated with the wide area network 112 travel over a second set of wires. Alternatively, the local network 106 and the wide area network 112 may share a common protocol (e.g., TCP/IP), but have their own physical wires. For example, the local network 106 may be an intranet and the wide area network 112 may be the Internet. In yet another alternative, the local network 106 and the wide area network 112 may be the same network (e.g., the Internet).

Figure 4:
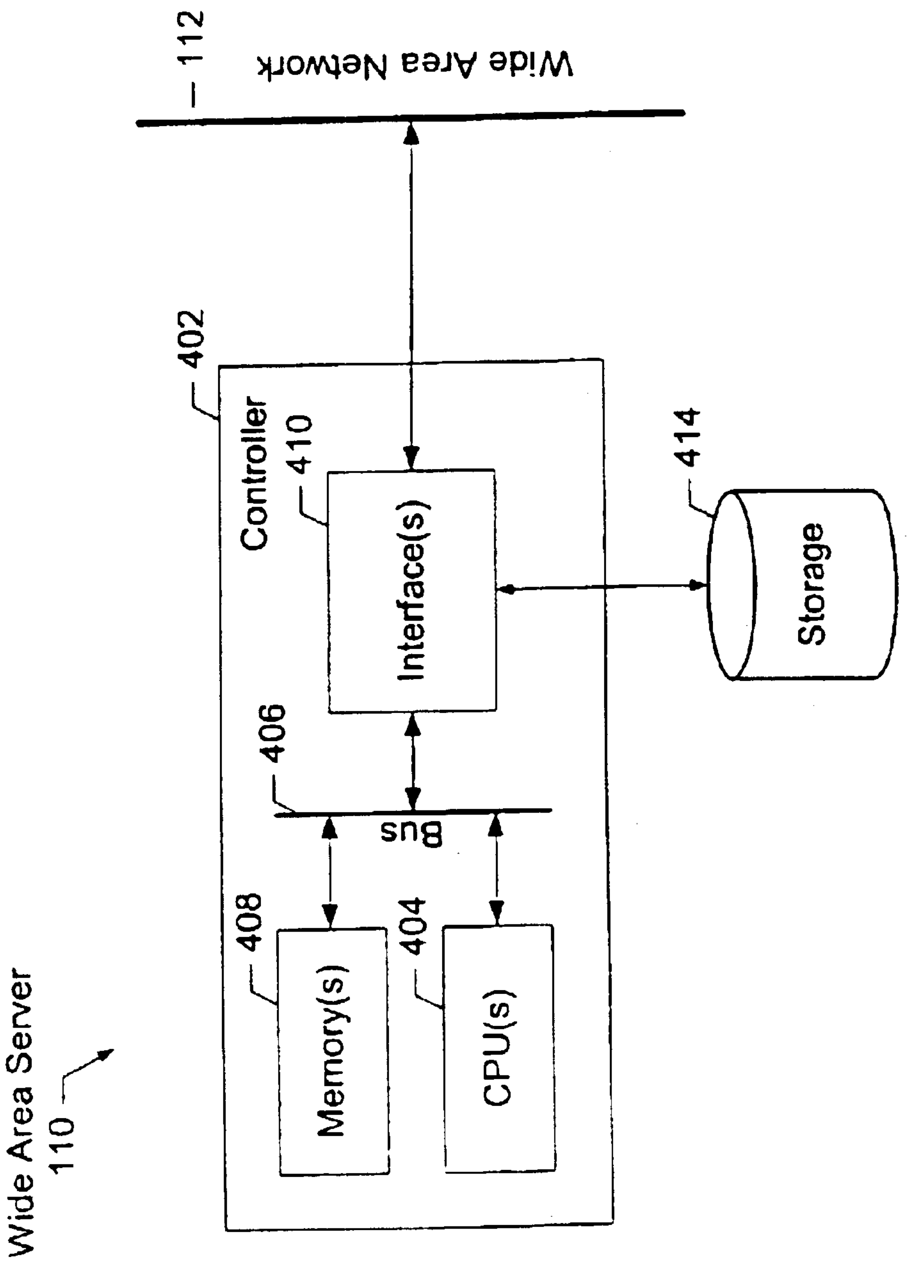
FIG. 4 is a more detailed block diagram of one of the wide area servers illustrated in FIG. 1.

A more detailed diagram of the wide area server 110, is illustrated in FIG. 4. The wide area server 110 is preferably a more powerful version of the local host 104 running different software adapted to coordinate the efforts of all the local hosts 104. The wide area server 110 also includes a controller 402 with a central processing unit 404 electrically coupled by an address/data bus 406 to a memory device 408 and an interface circuit 410. The CPU 404 may be any type of well known CPU, such as an Intel Pentium™ processor. The memory device 408 preferably includes volatile memory, such as a random-access memory (RAM), and non-volatile memory, such as a read only memory (ROM) and/or a magnetic disk. The memory device 408 stores a software program that implements all or part of the method described below. This program is executed by the CPU 404, as is well known. Some of the steps described in the method below may be performed manually or without the use of the wide area server 110.

The interface circuit 410 may be implemented using any data transceiver. Optionally, the wide area server 110 may include standard input and output devices such as keyboards and displays. In addition to the memory 408 (or included in the memory 408), the wide area server 110 preferably includes a storage device 414 for storing digital data associated with the cashless voucher operation described in detail below.

The wide area server 110 may also exchange data with other computing devices via a connection to the wide area network 112. The connection may be any type of network connection, such as an Ethernet connection. As described above, the wide area network 112 may be any type of network, such as an intranet or the Internet.

Figure 5:
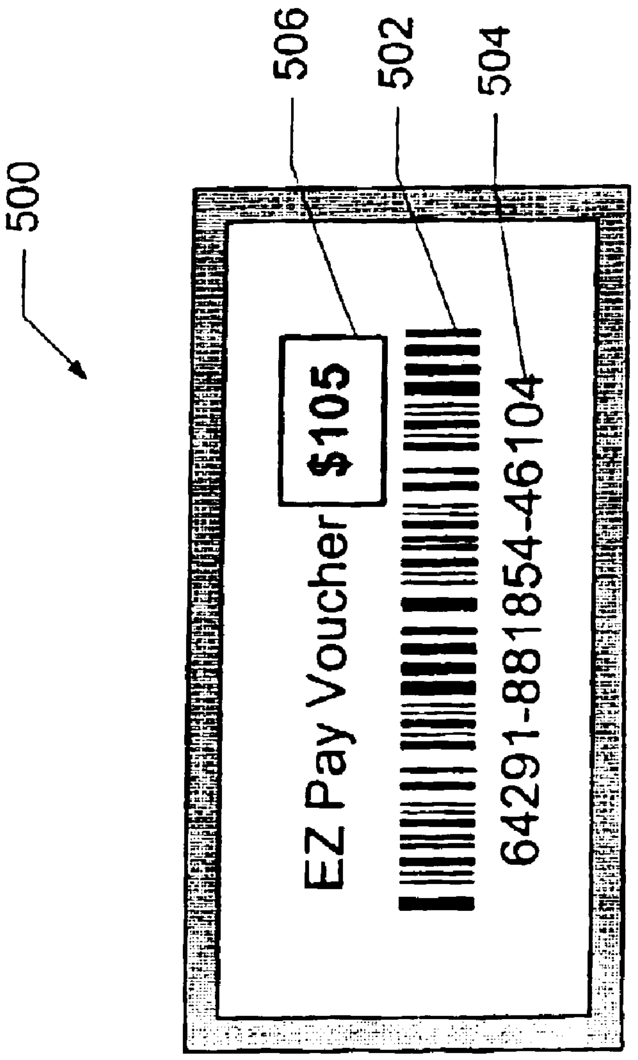
FIG. 5 is an exemplary cashless casino voucher.

An example of a cashless casino voucher 500 is illustrated in FIG. 5. In this example, the voucher 500 includes a machine readable bar code symbol 502. The bar code 502 represents an encoded voucher number. A human readable version 504 of the voucher number may also be included on the voucher 500. In the event that the bar code cannot be read, a human operator may type the number into a machine for redemption. Optionally, the value 506 of the voucher 500 is also included in human readable form. In this manner, the patron need not remember how much "cash" they have. The entire voucher 500 may be produced by a standard printing device such as a thermal printer or an ink jet printer. Preferably, proprietary stock is used in place of standard paper.

Figure 6:
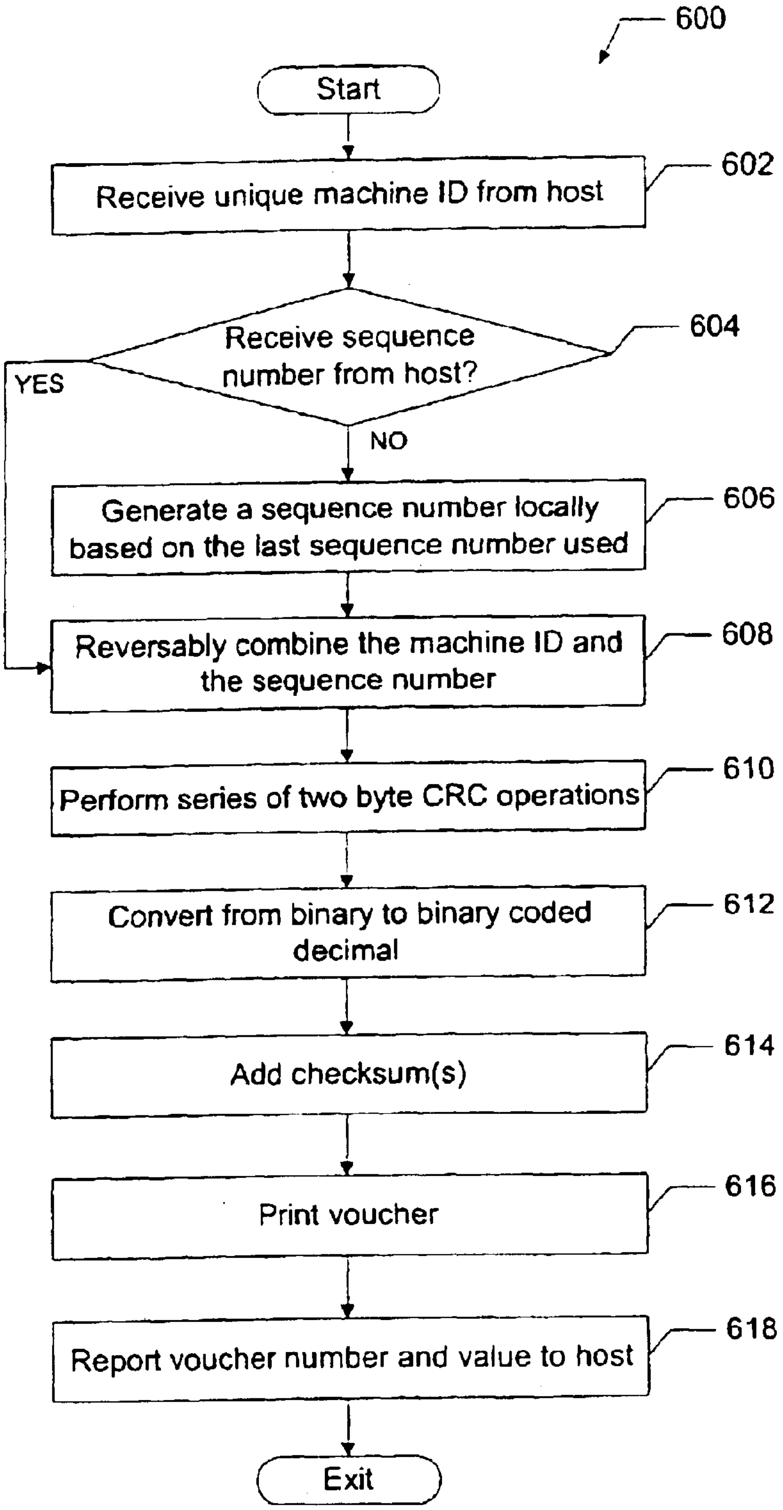
FIG. 6 is a flowchart of a process for encoding a cashless casino voucher.

A flowchart of a process 600 for encoding vouchers 500 in a cashless casino gaming system is illustrated in FIG. 6. Preferably, the process 600 is embodied in a software program which is stored in the casino game 102 memory 208 and executed by the casino game CPU 204 in a well known manner. However, some or all of the steps of the process 600 may be performed by another device such as the local host CPU 304 and/or the wide area server CPU 404. Further, one or more of the steps of the process 600 described below may be performed manually without the use of a CPU.

Generally, the process 600 receives a unique machine identification number and a sequence number from a local host 104. In the event that the local host 104 is unable to provide a sequence number, the process 600 generates a sequence number locally. Subsequently, the process 600 performs a series of numerical operations using the machine identification number and the sequence number to encode the voucher number. The voucher 500 is then printed for the patron and the number is reported to the local host 104.

The process 600 begins by receiving a unique machine identification number from the local host 104 via the local network 106 (step 602). Alternatively, the process 600 may retrieve the unique machine identification number locally, if the unique machine identification number is embedded into the casino game 102 when manufactured or programmed into the casino game memory 208 during a game setup operation.

Preferably, the sequence number is updated by the local host 104 after each voucher 500 is issued. Accordingly, the process 600 determines if the casino game 102 has received a sequence number from the local host 104 (step 604). If the casino game 102 has not received a sequence number from the local host 104, the sequence number may be generated locally by the controller 202 based on the most recently used sequence number (step 606). For example, the most recently used sequence number may be incremented by a predetermined amount to generate the next sequence number.

In a preferred embodiment, the casino game 102 receives a finite list of sequence numbers from the local host 104 after each voucher 500 is issued. As long as the casino game 102 and the local host 104 remain in communication, only the first sequence number in the list is used to generate a voucher number. However, if communication between the casino game 102 and the local host 104 is temporarily disabled, the process 600 uses subsequent sequence numbers on the list until communication is restored or the list is exhausted. In this manner, the next sequence number is still based on the previous sequence number (i.e., each number is only used once), but the next sequence number is not a simple increment of the most recently used sequence number. As a result, the encoding algorithm is more difficult to determine by simple inspection of issued voucher numbers, and fewer unauthorized vouchers 500 are issued.

Regardless of how the unique machine identification number and the sequence number are determined, the process 600 reversibly combines the unique machine identification number and the sequence number (step 608). Preferably, predetermined bits of the unique machine identification number are combined with predetermined bits of the sequence number using an exclusive- or (XOR) operation as described in detail with reference to FIG. 8 below. However, a person of ordinary skill in the art will readily appreciate that many other combinations of bits and operations may be performed in a reversible manner. For example, bits maybe swapped and/or shifted in a predetermined manner.

Subsequently, the process 600 preferably performs a series of two byte cyclic redundancy check (CRC) operations (step 610). For example, given a six byte combination from step 608, the process 600 may take the first two bytes and perform a CRC with base zero, resulting in another two byte number. Similarly, the middle two bytes from step 608 may be processed in this manner, as well as the last two bytes from step 608 as described in detail with reference to FIG. 8 below.

Next, the CRC results are preferably converted from binary to binary coded decimal (BCD) in a well known manner (step 612), and a checksum, based on the BCD conversion result is preferably appended to the number as described in detail below with reference to FIG. 8 (step 614). At this point, the process 600 has determined a valid voucher number.

Once the voucher number based on the unique machine identification number and the sequence number has been determined, the process 600 may print the voucher 500 for the patron (step 616). Of course, if a non-paper medium is used for the voucher 500, other means are used to "print" the voucher 500. For example, a magnetic media is written and a radio signal is transmitted.

The process 600 also transmits the voucher number and the value 506 of the voucher 500 to the local host 104 via the local network 106 if possible (step 618). If communication to the local host 104 is temporarily disabled, the process 600 preferably waits until communication is restored to report all of the voucher numbers that were issued since the last communication to the local host 104. Alternatively, the process 600 may just report the most recent voucher number issued, and the local host 104 may determine the complete list of voucher numbers issued by reversing the encoding (as described below with reference to FIG. 7) and calculating how many sequence numbers were used (either sequentially, according to a known algorithm, or from a list known to the local host 104). Preferably, when the local host 104 receives the voucher report from the casino game 102, the local host 104 responds with the next sequence number.

Figure 7:
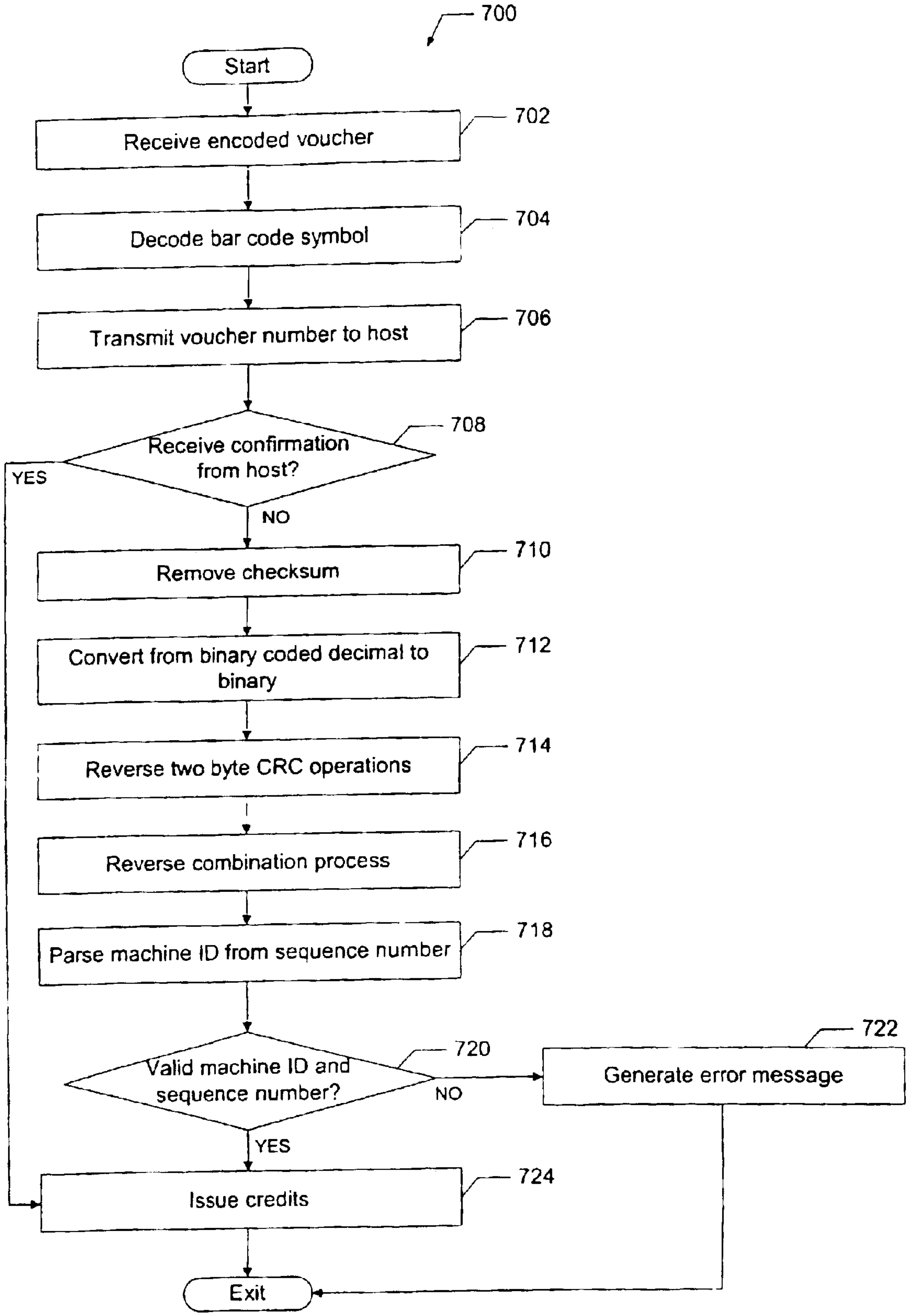
FIG. 7 is a flowchart of a process for decoding a cashless casino voucher.

A flowchart of a process 700 for decoding vouchers 500 in a cashless casino gaming system is illustrated in FIG. 7.

Preferably, the process 700 is embodied in a software program which is stored in the casino game 102 memory 208 and executed by the casino game CPU 204 in a well known manner. However, some or all of the steps of the process 700 may be performed by another device such as the local host CPU 304 and/or the wide area server CPU 404. Further, one or more of the steps of the process 700 described below may be performed manually without the use of a CPU.

Generally, the process 700 receives a voucher number by reading an encoded voucher 500. Preferably, the voucher number is sent to a local host 104 for confirmation. However, in the event that the casino game 102 is unable to communicate with the local host 104, the process 700 performs a series of numerical operations on the voucher number to determine the machine identification number and the sequence number encoded on the voucher 500. If the process 700 receives a confirmation message form the local host 104, or the process 700 determines locally that the voucher 500 is valid, the process 700 issues the appropriate number of game credits to the patron. The number of game credits may be determined by reading a number encoded on the voucher 500 and/or by receiving a message from the local host 104.

The process 700 begins by receiving an encoded voucher 500 (step 702). In a preferred embodiment, the process 700 receives the encoded voucher 500 by scanning a bar code symbol 502 printed on the voucher 500 in a well known manner. However, a person of ordinary skill in the art will readily appreciate that any method of transforming machine readable symbols into digital data may be used. For example, the voucher reader 214 may be a bar code reader, a magnetic card stripe reader, a magnetic disk drive, an optical disk drive, a solid state memory interface, a radio receiver, an infrared receiver, etc. In many instances, the digital data obtained from the voucher reader 214 may require further processing before the voucher number is represented in a typical binary format. For example, in the case of a bar code, the digital data indicative of the bars is converted to a binary number based on a particular bar code standard (step 704). Similarly, other well known standards of decoding may be used in the case of a magnetic card stripe reader, a magnetic disk drive, an optical disk drive, a solid state memory interface, a radio receiver, an infrared receiver, etc.

Subsequently, the process 700 preferably transmits the voucher number to the local host 104 for confirmation (step 706). The local host 104 may check the voucher number against a list of known good voucher numbers previously received from this casino game 102 as well as other casino games 102. Alternatively, or in addition, the local host 104 may perform a series of numerical operations on the voucher number to determine the machine identification number and the sequence number associated with the voucher number. The machine identification number and the sequence number may then be verified against a list of valid machine identification numbers and sequence numbers.

If the process 700 does not receive a confirmation message form the local host 104 within a predetermined time period (step 708), the process 700 performs a series of numerical operations on the voucher number to determine the machine identification number and the sequence number associated with the voucher number (steps 710–716). In the preferred embodiment, the first step in this process is removing and verifying the checksum (710). The checksum may be verified by performing the checksum operation described in detail below and obtaining a result of zero for a correct checksum. In this embodiment, the checksum may then be removed by replacing two nibbles holding the checksum with a value of zero.

If the checksum is correct, the process 700 converts the number (with the checksum removed) from binary coded decimal (BCD) to binary in a well known manner (step 712). The results of the conversion are then processed to reverse the two byte CRC operations (step 714). It is known from the theory of polynomials that applying 2-byte CRC polynomials over any two different 2-byte values amounts to two different CRC results. This observation provides the grounds for reversing the CRC applied over 2-byte values. The reversing can be done in different ways depending, for example, on how the implementation for the direct CRC is done. In the preferred embodiment, a table-based algorithm for implementing the direct CRC calculation is used for real-time efficiency. Using the same table and a reverse algorithm allows the process 700 to obtain the direct data given the calculated CRC over it.

Once the CRC is reversed, the process 700 preferably reverses the combination process in a well know manner (step 716). For example, if the machine identification number and the sequence number are combined in an exclusive-or (XOR) operation as described in detail below, the process may be reversed because one of the inputs to the XOR is known, and the output of the XOR is known. Similarly, if bits have been swapped or shifted one way in a predetermined manner, the bits may be swapped or shifted back in an opposite manner. Subsequently, the machine identification number and the sequence number may be parsed (step 718). In the preferred embodiment, the machine identification number and the sequence number are concatenated, therefore, the parsing step is performed by splitting the concatenated number at the midpoint.

Once the machine identification number and the sequence number are determined from the voucher number, the process 700 may determine if the machine identification number and the sequence number are valid by checking the numbers against a predetermined list of valid numbers (step 720). If the machine identification number or the sequence number is invalid, the process 700 generates an error message (step 722). The error message may be reported to the patron via the casino game display 216, and the error message may be reported to the local host 104 via the local network 106. If the machine identification number and the sequence number are valid, regardless of whether this determination is made locally by the casino game 102 or reported to the casino game 102 by the local host 104, the process 700 issues the appropriate number of game credits (step 724). The appropriate number of game credits may be determined by reading a number encoded on the voucher 500 and/or by receiving a message from the local host 104.

Figure 8:
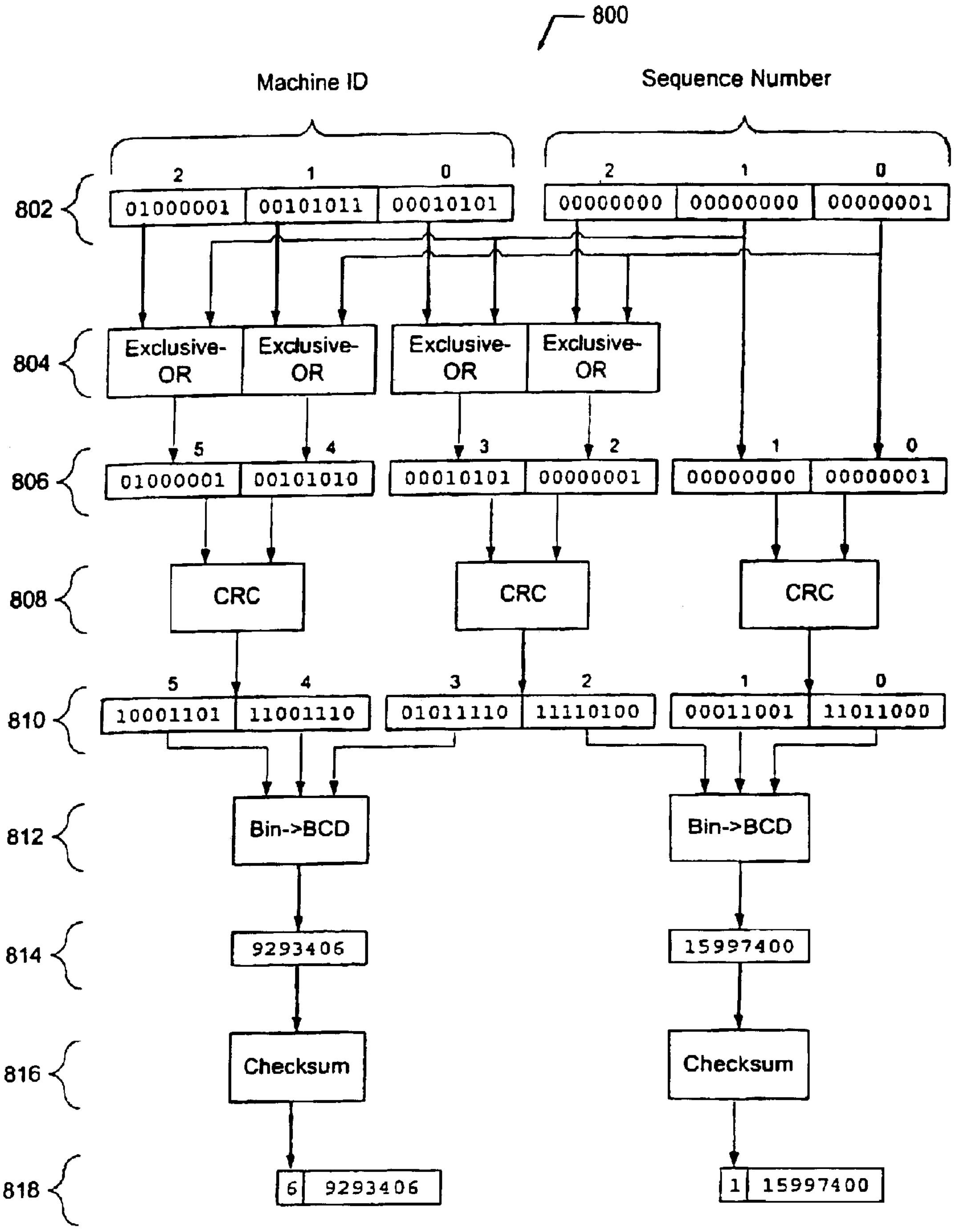
FIG. 8 is a block diagram illustrating an example of converting a machine identification number and a sequence number into a cashless casino voucher number.

An example of converting a machine identification number and a sequence number into a cashless casino voucher number is illustrated in FIG. 8. In this example, a three byte machine identification number and a three byte sequence number 802 are used. The machine identification number and the sequence number are combined using an exclusive-or (XOR) operation 804. Specifically, byte-2 of the machine identification number is XORed with byte-1 of the sequence number to produce byte-5 of the XOR result 806 (i.e., 01000001 XOR 00000000=01000001). Similarly, byte-1 of the machine identification number is XORed with byte-0 of the sequence number to produce byte-4 of the XOR result 806 (i.e., 00101011 XOR 00000001=00101010). Byte-0 of the machine identification number is XORed with byte-1 of the sequence number to produce byte-3 of the XOR result 806. Byte-2 of the sequence number is XORed with byte-0 of the sequence number to produce byte-2 of the XOR result 806. Byte-1 of the sequence number is used as byte-1 of the XOR result 806, and byte-0 of the sequence number is used as byte-0 of the XOR result 806.

A cyclic redundancy check 808 (CRC) is then performed on the XOR result 806 to produce a CRC result 810 in a well known manner. Preferably, the CRC function is performed on the XOR result 806 two bytes at a time. A binary to binary coded decimal (BCD) conversion 812 is then performed on the CRC result 810 to produce a BCD result 814 in a well known manner. For example, 100011011100111001011110 binary is equal to 9293406 decimal which would be stored as 0000 1001 0010 1001 0011 0100 0000 0110). In this example, the checksum 816 is appended to the BCD result 814 to produce the voucher number 818 by summing the individual BCD results 814, performing a modulus-5 operation, and doubling the result for storage in the unused upper nibble of the BCD result 814. For example, ((0+9+2+9+3+4+0+6) mod 5)*2=6.

In summary, persons of ordinary skill in the art will readily appreciate that a method and apparatus of encoding machine readable vouchers for use in a cashless casino gaming system has been provided.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method in a casino gaming system, the casino gaming system comprising a plurality of casino gaming machines operatively coupled to a host computer via a network, wherein each of the plurality of casino gaming machines has associated therewith a respective unique machine identification number, the method comprising:

determining a sequence number associated with a voucher number to be generated, wherein the sequence number is different from sequence numbers associated with voucher numbers previously generated;

combining, using a casino gaming machine, the machine identification number associated with the casino gaming machine with the sequence number to form a combined number;

performing a cyclic redundancy check (CRC) operation on at least a portion of the combined number, using the casino gaming machine, to generate at least one CRC result;

generating a voucher number based on the at least one CRC result and not based on the at least the portion of the combined number using the casino gaming machine; and writing the voucher number generated based on the at least one CRC result to a machine readable medium.

2. A method as defined in claim 1, wherein determining the sequence number associated with the voucher number to be generated comprises:

if a sequence number is received by the casino gaming machine from the host computer via the network, determining the sequence number associated with the voucher number to be generated as the received sequence number;

if a sequence number is not received by the casino gaming machine from the host computer via the network, calculating, using the casino gaming machine, the sequence number associated with the voucher number to be generated based on a sequence number associated with a voucher number previously generated by the casino gaming machine.

3. A method as defined in claim 1, further comprising receiving at the casino gaming machine a first plurality of sequence numbers from the host computer via the network, wherein at least some of the first plurality of sequence numbers are not associated with voucher numbers previously generated by the casino gaming machine;

wherein determining the sequence number associated with the voucher number to be generated comprises:

if a second plurality of sequence numbers is received by the casino gaming machine from the host computer via the network subsequent to receiving the first plurality of sequence numbers, selecting, using the casino gaming machine, one of the second plurality of sequence numbers as the sequence number associated with the voucher number to be generated;

if a second plurality of sequence numbers is not received by the casino gaming machine from the host computer via the network subsequent to receiving the first plurality of sequence numbers, selecting, using the casino gaming machine, one of the first plurality of sequence numbers not associated with voucher numbers previously generated by the casino gaming machine as the sequence number associated with the voucher number to be generated.

4. A method as defined in claim 1, further comprising receiving the machine identification number associated with the casino gaming machine from the host computer via the network.

5. A method as defined in claim 1, wherein combining the machine identification number associated with the casino gaming machine with the sequence number comprises performing an exclusive- or operation on at least a portion of the machine identification number and at least a portion of the sequence number.

6. A method as defined in claim 1, wherein combining the machine identification number associated with the casino gaming machine with the sequence number comprises concatenating at least a portion of the machine identification number with at least a portion of the sequence number.

7. A method as defined in claim 1, wherein combining the machine identification number associated with the casino gaming machine with the sequence number comprises performing a bit-shifting operation on at least a portion of the machine identification number and at least a portion of the sequence number.

8. A method as defined in claim 1, wherein combining the machine identification number associated with the casino gaming machine with the sequence number comprises performing a bit swapping operation on at least a portion of the machine identification number and at least a portion of the sequence number.

9. A method as defined in claim 1, further comprising converting, using the casino gaming machine, the CRC result from a binary format to a binary coded decimal format.

10. A method as defined in claim 1, wherein generating the voucher number based on the at least one CRC result comprises generating a checksum of a number based on the at least one CRC result, and concatenating the checksum with the number based on the at least one CRC result.

11. A casino gaming machine for use in a casino gaming system, the casino gaming system comprising a plurality of casino gaming machines operatively coupled to a host computer via a network, wherein each of the plurality of casino gaming machines has associated therewith a respective unique machine identification number, the casino gaming machine comprising:

a network interface circuit to operatively link the casino gaming machine to the host computer via the network;

a voucher dispenser;

a controller operatively coupled to the network interface circuit and the voucher dispenser, the controller comprising a microprocessor and a memory operatively coupled to the microprocessor, the controller being programmed to determine a sequence number associated with a voucher number to be generated, wherein the sequence number is different from sequence numbers associated with at least some voucher numbers previously generated, the controller being programmed to logically combine the machine identification number associated with the casino gaming machine with the sequence number to form a combined number, the controller being programmed to perform a cyclic redundancy check (CRC) operation on at least a portion of the combined number to generate at least one CRC result, the controller being programmed to generate a voucher number based on the at least one CRC result and not based on the at least the portion of the combined number, and the controller being programmed to cause the voucher dispenser to write the voucher number generated based on the at least one CRC result to a machine readable medium.

12. A casino gaming machine as defined in claim 11, wherein the controller is programmed to, if a sequence number is received from the host computer via the network, determine the sequence number associated with the voucher number to be generated as the received sequence number; and if a sequence number is not received from the host computer via the network, calculate the sequence number associated with the voucher number to be generated based on a sequence number associated with a voucher number previously generated by the casino gaming machine.

13. A casino gaming machine as defined in claim 11, wherein the controller is programmed to receive a first plurality of sequence numbers from the host computer via the network;

wherein the controller is programmed to, if a second plurality of sequence numbers is received from the host computer via the network subsequent to receiving the first plurality of sequence numbers, and if at least some of the first plurality of sequence numbers are not associated with voucher numbers previously generated by the casino gaming machine, select one of the second plurality of sequence numbers as the sequence number associated with the voucher number to be generated;

wherein the controller is programmed to, if a second plurality of sequence numbers is not received from the host computer via the network subsequent to receiving the first plurality of sequence numbers, select one of the first plurality of sequence numbers not associated with voucher numbers previously generated by the casino gaming machine as the sequence number associated with the voucher number to be generated.

14. A casino gaming machine as defined in claim 11, wherein the voucher dispenser comprises a bar code printer.

15. A casino gaming machine as defined in claim 11, wherein the voucher dispenser comprises a magnetic media writer.

16. A casino gaming machine as defined in claim 11, wherein the voucher dispenser comprises a wireless transmitter.

17. A computer readable medium storing a software program for use in a casino gaming system, the casino gaming system comprising a plurality of casino gaming machines operatively coupled to a host computer via a network, wherein each of the plurality of casino gaming machines has associated therewith a respective unique machine identification number, the software program for generating a voucher number at one of the plurality of casino gaming machines, the computer readable medium comprising:

first code for determining a sequence number associated with the voucher number to be generated, wherein the sequence number is different from sequence numbers associated with at least some voucher numbers previously generated;

second code for combining the machine identification number associated with the casino gaming machine that is to generate the voucher number with the sequence number to form a combined number;

third code for performing a cyclic redundancy check (CRC) operation on at least a portion of the combined number to generate at least one CRC result;

fourth code for generating a voucher number based on the at least one CRC result and not based on the at least the portion of the combined number; and fifth code for writing the voucher number based on the at least one CRC result to a machine readable medium.

18. A computer readable medium as defined in claim 17, wherein the first code comprises:

sixth code for, if a sequence number is received from the host computer via the network, determining the sequence number associated with the voucher number to be generated as the received sequence number;

seventh code for, if a sequence number is not received from the host computer via the network, calculating the sequence number associated with the voucher number to be generated based on a sequence number associated with a voucher number previously generated by the casino gaming machine.

19. A computer readable medium as defined in claim 17, further comprising sixth code for receiving a first plurality of sequence numbers from the host computer via the network, wherein at least some of the first plurality of sequence numbers are not associated with voucher numbers previously generated by the casino gaming machine;

wherein the first code comprises:

seventh code for, if a second plurality of sequence numbers is received from the host computer via the network subsequent to receiving the first plurality of sequence numbers, selecting one of the second plurality of sequence numbers as the sequence number associated with the voucher number to be generated;

eighth code for, if a second plurality of sequence numbers is not received from the host computer via the network subsequent to receiving the first plurality of sequence numbers, selecting one of the first plurality of sequence numbers not associated with voucher numbers previously generated by the casino gaming machine as the sequence number associated with the voucher number to be generated.

20. A method in a casino game system, the casino game system comprising a plurality of casino gaming machines and at least one voucher dispensing machine operatively coupled to a host computer via a network, wherein each of the plurality of casino gaming machines and the at least one voucher dispensing machine has associated therewith a respective unique machine identification number, the method comprising:

determining a sequence number associated with a voucher number to be generated, wherein the sequence number is different from sequence numbers associated with at least some voucher numbers previously generated;

combining, using a voucher dispensing machine, the machine identification number associated with the voucher dispensing machine with the sequence number to form a combined number;

performing a cyclic redundancy check (CRC) operation on at least a portion of the combined number, using the voucher dispensing machine, to generate at least one CRC result;

generating a voucher number based on the at least one CRC result and not based on the at least the portion of the combined number using the voucher dispensing machine; and writing the voucher number generated based on the at least one CRC result to a machine readable medium.

21. A voucher dispensing machine for use in a casino gaming system, the casino gaming system comprising a plurality of casino gaming machines and at least one voucher dispensing machine operatively coupled to a host computer via a network, wherein each of the plurality of casino gaming machines and the at least one voucher dispensing machine has associated therewith a respective unique machine identification number, the voucher dispensing machine comprising:

a network interface circuit to operatively link the voucher dispensing machine to the host computer via the network;

a voucher dispenser;

a controller operatively coupled to the network interface circuit and the voucher dispenser, the controller comprising a microprocessor and a memory operatively coupled to the microprocessor, the controller being programmed to determine a sequence number associated with a voucher number to be generated, wherein the sequence number is different from sequence numbers associated with at least some voucher numbers previously generated, the controller being programmed to combine the machine identification number associated with the voucher dispensing machine with the sequence number to form a combined number, the controller being programmed to perform a cyclic redundancy check (CRC) operation on at least a portion of the combined number to generate at least one CRC result, the controller being programmed to generate a voucher number based on the at least one CRC result and not based on the at least the portion of the combined number, and the controller being programmed to cause the voucher dispenser to write the voucher number generated based on the at least one CRC result to a machine readable medium.

22. A casino gaming machine for use in a casino gaming system, the casino gaming system comprising a plurality of casino gaming machines operatively coupled to a host computer via a network, wherein each of the plurality of casino gaming machines has associated therewith a respective unique machine identification number, the casino gaming machine comprising:

a network interface circuit to operatively link the casino gaming machine to the host computer via the network;

a voucher dispenser;

a controller operatively coupled to the network interface circuit and the voucher dispenser, the controller comprising a microprocessor and a memory operatively coupled to the microprocessor, the controller being programmed to, if a host-provided sequence number is received from the host computer via the network, determine a sequence number as the host-provided sequence number, wherein the sequence number is associated with a voucher number to be generated, wherein the sequence number is different from sequence numbers associated with voucher numbers previously generated, the controller being programmed to, if the host-provided sequence number is not received from the host computer via the network, calculate the sequence number, the controller being programmed to combine the machine identification number associated with the casino gaming machine with the sequence number to form a combined number, the controller being programmed to perform a cyclic redundancy check (CRC) operation on at least a portion of the combined number to generate at least one CRC result, the controller being programmed to generate a voucher number based on the at least one CRC result, and the controller being programmed to cause the voucher dispenser to write the voucher number based on the at least one CRC result to a machine readable medium.

23. A casino gaming machine for use in a casino gaming system, the casino gaming system comprising a plurality of casino gaming machines operatively coupled to a host computer via a network, wherein each of the plurality of casino gaming machines has associated therewith a respective unique machine identification number, the casino gaming machine comprising:

a network interface circuit to operatively link the casino gaming machine to the host computer via the network;

a voucher dispenser;

a controller operatively coupled to the network interface circuit and the voucher dispenser, the controller comprising a microprocessor and a memory operatively coupled to the microprocessor, the controller being programmed to receive a first plurality of host-provided sequence numbers from the host computer via the network, the controller being programmed to, if a second plurality of host-provided sequence numbers is received from the host computer via the network subsequent to receiving the first plurality of host-provided sequence numbers, select one of the second plurality of sequence numbers as the sequence number, wherein the sequence number is associated with a voucher number to be generated, wherein the sequence number is different from sequence numbers associated with voucher numbers previously generated, the controller being programmed to, if the second plurality of host-provided sequence numbers is not received from the host computer via the network subsequent to receiving the first plurality of host-provided sequence numbers, select one of the first plurality of sequence numbers not associated with voucher numbers previously generated by the casino gaming machine as the sequence number associated with the voucher number to be generated, the controller being programmed to combine the machine identification number associated with the casino gaming machine with the sequence number to form a combined number, the controller being programmed to perform a cyclic redundancy check (CRC) operation on at least a portion of the combined number to generate at least one CRC result, the controller being programmed to generate a voucher number based on the at least one CRC result, and the controller being programmed to cause the voucher dispenser to write the voucher number based on the at least one CRC result to a machine readable medium.

* * * * *